No. 693,569. Patented Feb. 18, 1902.
E. C. SCHROTTKY.
METHOD OF MALTING RICE.
(Application filed Nov. 8, 1901.)
(No Model.)
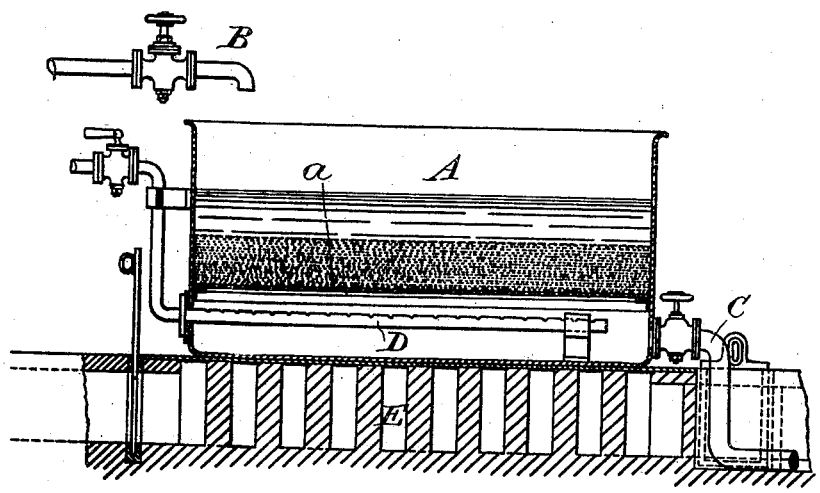
Witnesses:—
Henry Thieme.
George Barry Jr.
Inventor:—
Eugene Charles Schrottky
By attorneys
Brown & Seward

UNITED STATES PATENT OFFICE.

EUGENE CHARLES SCHROTTKY, OF DRESDEN, GERMANY.

METHOD OF MALTING RICE.

SPECIFICATION forming part of Letters Patent No. 693,569, dated February 18, 1902.

Application filed November 8, 1901. Serial No. 81,590. (No specimens.)

*To all whom it may concern:*

Be it known that I, EUGENE CHARLES SCHROTTKY, a subject of the King of Great Britain and Ireland, and a resident of Dresden, in the Kingdom of Saxony, in the German Empire, have invented a new and useful Improved Method of Malting Rice, of which the following is a specification.

This invention relates to an improved method for malting rice, so as to convert the rice into a malt of highest quality for brewing and other purposes, and especially to avoid any putrefaction in the rice-malt and in the liquids manufactured therefrom.

Though unshelled rice is one of the best and cheapest starch-containing cereals, its use for the purposes of brewing beer and distilling spirits and alcohol has up till now been very limited and has been confined chiefly to rice-flour, which is little profitable on account of its relatively high price and of its containing but little albumen, which substance, in rice even more than in other cereals, is chiefly deposited in the outer layers and which is lost in the milling.

The known methods of malting, which mainly consist, in the first place, in steeping the corn in water and allowing it then to germinate on floors in heaps and periodically turning the same according to growth and temperature, will not do for rice, the same being a tropical marsh plant, the germinating conditions for which are totally different.

In some parts of Asia a primitive method of malting rice is known for the manufacture of rice beer and arrack. The rice is put into a cask, water of ordinary temperature is then poured onto it, and the rice allowed to soak and germinate in this water for a space of ten days or so, stirring the grain occasionally. This method yields, however, a very defective malt and is useless for the brewing and distilling industry, for only forty per cent. of the rice will under such treatment sufficiently and satisfactorily germinate, forty per cent. will not germinate at all, while the rest, of about twenty per cent. or so, putrefies, thus not only causing a great loss in the material, but tainting the fermented product and making it less wholesome. It appeared, therefore, to me as evident that in this primitive method the main conditions for a successful germination of rice are not fulfilled.

The improved method for malting rice according to the present invention is based upon the observation that the defect in the primitive known method consists, in the first instance, in not sufficient air being able to get to the germinating corn. The organic changes which take place during germination require oxygen for the development of the diastase and for the growth of the rootlets and the plumule. It was further observed that the germinating process of rice will most advantageously take place in water at a temperature of about 35° to 38° centigrade. The malting must, therefore, not only take place in or below water at the temperature indicated, but air must periodically have free access to the germinating rice.

The accompanying drawing represents in vertical section an apparatus which serves the purpose of carrying out my invention.

A is an open water-tight tank or vessel which is furnished at some distance from its bottom proper with a perforated false bottom a. B is a pipe above said tank for the introduction of water, and C is a pipe below the false bottom for drawing off water.

D is a steam-pipe running through the tank below the false bottom for the introduction of steam for heating the contents of the tank above the said bottom. This pipe is represented as having the part within the vessel perforated.

E represents heating-flues under the bottom of the vessel.

It may not be necessary to use both of the above-mentioned means of heating, one of them being in most cases sufficient.

The process is conducted in this apparatus in the following manner: The unshelled rice, which first of all may be subjected to the known preparatory treatment of washing, sorting, and cleaning, is put into the tank above the perforated false bottom in a layer of about fifteen centimeters deep, and water of ordinary temperature is then let onto it, so that the water covers the grain for several centimeters. I stir this rice well and after having removed all husks and light grain and whatever floats on top of the water draw the water off. Then a second lot of water of a temperature of 35° to 38° centigrade is let on the rice and allowed to cover it for several centimeters, and the grain has now to soak and steep in this warm water for some time, a temperature of about 35° centigrade being kept up either by allowing steam to pass through such pipe permanently or periodically or by the circulation of hot air or gases through the flues E. By suitable cocks in the piping or dampers in the flues the temperature of the water may be controlled. When using fresh rice, this soaking and steeping process may be extended to twenty-four to thirty hours. For old rice, however, forty-eight to fifty-four hours are necessary, keeping up temperature of 35° centigrade. The steeping should be arranged so that the time necessary for it terminates toward the evening, when the steeping-water is let off and the rice allowed to remain without water for that night. By keeping the water-outlet pipes below the false bottom open the air has free access to pass through the layer of rice, or air may be pumped through it, so that the grain during the night may have ample facility to absorb the oxygen necessary for the process of germination. Next morning a fresh supply of water of 35° to 38° centigrade is let on the rice, so as to cover the same for about seven centimeters, and kept on it for about twelve hours till the evening, care being taken to keep the water up to this temperature. In the evening the water is again let off, and the rice remains without water for the night. This alternate treatment of the grain—viz., in water during the day for about twelve hours and without water with free access to the air during the night, keeping the temperature of the water up to about 35° centigrade—is continued for about five or six days. It is of advantage to keep the temperature of the malting-house also up to about 30° centigrade. This alternating treatment of the rice and the maintaining of the necessary temperature in the water are the main conditions for a successful and satisfactory malting. The periodical drawing off of the water may be dispensed with by pumping air through the rice layer. This method has, however, not been found to yield as good results as what has been above described. At the end of these five or six days alternate treatment nearly every grain of rice will be found to have germinated, and the rootlets will have grown about twice as long as the rice-corn.

If the rice is of the year's harvest, five days of alternate treatment, not including the first-mentioned soaking or steeping time, will be sufficient to make a good malt. If old rice is used, then the alternating treatment should be continued for six days.

After germination has proceeded sufficiently for the development of the diastase—say in the morning of the sixth or seventh day alternate treatment—the grain is to be carefully shoveled together, so as to make a layer of thirty centimeters, so as to get the warmth for the final development. No water is put on, and in the evening the heap is opened out and reduced again to a layer of fifteen centimeters or even less to prevent overheating. On the following morning the malt will be found ready and can then be dried in the usual way or used at once as "green" malt for the manufacture of beer, spirit, or glucose.

I claim—

The herein-described method of producing malt from rice which consists in subjecting unshelled rice alternately and repeatedly to steeping in water and to exposure to air at a temperature of from about 35° to 38° centigrade.

In testimony that I claim the foregoing as my invention I have signed my name, in presence of two witnesses, this 27th day of April, 1901.

EUGENE CHARLES SCHROTTKY.

Witnesses:
HERNANDO DE SOTO,
PAUL ARRAS.